Patented Dec. 12, 1944

2,364,701

UNITED STATES PATENT OFFICE 2,364,701

PROCESS FOR PRODUCTION OF CITRIC ACID BY FERMENTATION

William Eisenman and Max D. Blumenfeld, New York, N. Y., assignors, by mesne assignments, to Heyden Chemical Corporation, New York, N. Y., a corporation of Delaware No Drawing. Application November 7, 1941, Serial No. 418,164

5 Claims. (Cl. 195—36)

This invention relates to an improved process for obtaining citric acid by fermentation of nutrient solutions containing carbohydrates by mold fungi including Aspergillus, Citromyces, Mucor and Penicillium.

More particularly it concerns the nutrient salts or substances which are necessary in the medium for the proper growth and functioning of the mycellium to produce citric acid.

It has long been recognized that in fermentation processes mold fungi require for their metabolism certain nutrient substances which are chemically independent of, and unrelated to, the carbohydrate undergoing fermentation. Such nutrients may be salts or other compounds which supply nitrogen, potassium, phosphorus, sulfur, zinc and magnesium in usable form to the fungi.

It is important in preparing an efficient, controlled fermentation medium to add all the necessary nutrients, and to add them in the correct weight ratio to each other and to the carbohydrate material present. Currie (J. Biol. Chem. 31, 15–37 (1917)) and Doelger and Prescott (Ind. Eng. Chem., 26, 1142 (1934)) claim to have prepared such media most favorable for the citric fermentation by *Aspergillus niger*. The compositions of their media in grams per 1000 cc. of solutions are as follows:

TABLE I

| 1000 cc. of solution contain | Currie | Doelger and Prescott |
|---|---|---|
| Saccharose | 125–150 g. | 140 g. |
| NH$_4$NO$_3$ | 2.0–2.5 g.=(0.0675% N). | 2.23 g. |
| KH$_2$PO$_4$ | 0.75–1.0 g.=(0.028% K). | 1.0 g. |
| MgSO$_4$.7H$_2$O | 0.20–0.25 g. | 0.23 g. |
| | pH 3.4–3.5 by addition of 4 to 5 cc. $\frac{N}{5}$HCl | pH 2.20 to 0.60 by adding $\frac{N}{T}$HCl |

These two very similar media can be easily prepared from relatively pure but expensive raw sugar and refined sugar. However, it is impossible to prepare them from the more impure, but commercially practical, starting materials such as blackstrap molasses, beet molasses, and Hytest cane molasses, since these originally contain amounts of nitrogen and potassium exceeding the limits for these media. This is evident when the compositions of Currie's and Doelger and Prescott's media are compared with the total ash, nitrogen and potassium present in twenty per cent solutions of various carbohydrate raw materials, as set forth below.

TABLE II

*Nitrogen and potassium content of diluted raw materials (20% fermentable carbohydrates)*

| Raw material | Sucrose and invert sugar | Ash | Nitrogen | Potassium |
|---|---|---|---|---|
| | | Per cent | Per cent | Per cent |
| Refined sugar | Sucrose, 20% | Trace | Trace | Trace. |
| Raw sugar | do | 0.04 to 0.06 | Trace to 0.012 | 0.012 to 0.016. |
| Cane | Sucrose, 11.4% | } 0.52 to 0.57 | 0.029 to 0.057 | 0.175 to 0.230. |
| Hytest molasses | Invert, 8.6% | | | |
| Cane | Sucrose, 12.5% | } 3.3 to 4.2 | 0.167 to 0.250 | 0.75 to 0.92. |
| Blackstrap molasses | Invert, 7.5% | | | |
| Beet molasses | Sucrose, 20.0% | 2.5 to 4.1 | 0.655 to 0.900 | 1.15 to 1.31. |

It should be noted, for example, that blackstrap molasses having 20% sucrose contains at least 0.167% nitrogen and 0.75% potassium, whereas the medium of Doelger and Prescott, which has 15% sucrose permits no more than 0.117% nitrogen and 0.037% potassium, based on 20% sugar.

The molasses type of raw material may contain varying percentages of impurities in addition to, or as sources of, the relatively high amounts of nitrogen and potassium such as sulfates, chlorides, nitrates of ammonium, calcium, sodium and potassium; amino acids, proteins in various stages of degradation, unfermentable sugars such as glutose, organic acids such as acetic and lactic or their salts, and traces of heavy metals such as iron, copper, nickel and chromium.

Since it is uneconomical to purify these raw materials which are by-products of the sugar industry, many investigators have tried to determine the conditions under which mold fungi would ferment them in their impure state to citric acid. We have now discovered that if sufficient additional amounts of nitrogen and potassium are provided in nutrient form and in the ratio of 1 nitrogen to 1.35–1.5 potassium, mold fungi will grow more rapidly, and will give high yields of citric acid and high production per fermenting unit.

This is a surprising discovery, as molasses already contains more nitrogen and potassium than the media of Currie and of Doelger and Prescott. Furthermore, it has always been claimed in the literature that large amounts of nitrogen encourage excessive growth of the mycellium with consequent lowered yields of citric acid. We have found this to be untrue, since in most cases the fungi cannot assimilate properly the nitrogen and potassium in the form originally present in the molasses. We have discovered that organic nitrogen, especially in the form of urea, should be added as a suitable source of nitrogen; and that potassium should be added as its organic acid salts, such as the formate, acetate, lactate or citrate. By adding the nitrogen and potassium in these nutrient forms, the introduction of inorganic ions such as $NO_3-$, $Cl-$, $SO_4=$ in objectionable quantities is avoided.

The use of urea as a cheap source of organic nitrogen in fermentation is well known. Also, the necessity for the presence of potassium salts in the fermenting medium is well known. These facts are in themselves separately recognized.

However, we have found in our work on the citric acid fermentation that these two essential components must be supplied to the medium in nutrient form and in definite and fixed ratio to each other. When urea and potassium acetate (or another fatty acid salt of potassium) is supplied, and at certain fixed ratios, results are obtained which are far superior to any hitherto known. So far as we know, no one has used these two essential components together as we have done. The resulting fermentation takes less time and gives yields of citric acid of greater purity and much higher percentage.

With this quantity and ratio of nutrient nitrogen and nutrient potassium, there is a very rapid growth of the mycellium. The production of acid starts earlier in the life cycle of the organism. There is no slowing down due to abnormal rise of temperature. This quantity and ratio of nutrient nitrogen and nutrient potassium enables the organism to ignore completely the presence of other nitrogen and potassium components that may be present as impurities in the carbohydrate materials.

It should be recognized at this point that in addition to nitrogen and potassium, magnesium, zinc, phosphorus and sulfur must be present in the medium in the conventional forms and amounts.

The following examples describe two of the various ways in which the principle of our invention may be employed. It is to be understood, however, that such examples are purely illustrative, and are not to be construed as a limitation on the invention, since many successful variations may be made as long as the indicated amounts of, and ratio between, nitrogen and potassium are maintained.

EXAMPLE 1

To a solution of 500 g. of sucrose (commercial refined) in 1000 g. of water, were added:

|   | Grams |
|---|---|
| Urea (4.2 g. of N) | 9 |
| Glacial acetic acid | 12.6 |
| $K_2CO_3.2H_2O$ (6.1 g. of K) | 13.6 |
| $KH_2PO_4$ | 1.5 |
| $MgSO_4.7H_2O$ | 0.75 |
| $ZnSO_4.7H_2O$ | 0.05 |

The ratio of nitrogen to potassium, namely 4.2 to 6.1, is about 1 to 1.5. The acetic acid in reacting with the $K_2CO_3 2H_2O$ produces 15.32 g. of potassium acetate.

The resulting solution was diluted to 2500 cc. and was inoculated in the usual manner with *Aspergillus niger* spores from the strain #1015 American type culture collection. Fermentation was carried out for 6 days between 28° C. and 35° C. A 56% yield (282 g.) of citric acid was obtained.

EXAMPLE 2

To 1300 g. of molasses containing 650 g. of sugar, were added:

|   | Grams |
|---|---|
| Urea (4.2 g. of N) | 9 |
| Glacial acetic acid | 12.6 |
| $K_2CO_3.2H_2O$ (6.1 g. of K) | 13.6 |
| $KH_2PO_4$ | 1.5 |
| $MgSO_4$ | 0.75 |
| $ZnSO_4$ | 0.10 |

The resulting solution was diluted with water to 3900 cc. (14.0° Bé.). Inoculation was carried out in the usual manner with spores from strain *Aspergillus niger* (#1015) American type culture collection. Fermentation was carried out for 7 days between 28 and 35° C. A 40% yield (264 g.) of citric acid was obtained.

EXAMPLE 3

1300 g. of molasses were treated in the same manner as described in Example 2, except that materials supplying the additional amounts of effective nitrogen and effective potassium (urea, acetic acid, potassium carbonate) were omitted. Little or no citric acid was formed.

When one compares the yield obtained in Example 1 with yields reported by Doelger and Prescott (compare (g) and (b), Table III) it is apparent that, using a cruder sugar, we have increased the average yield of citric acid by almost 25%.

Furthermore, from a commercial standpoint, it is just as important to note that we have also been able to increase the output of citric acid per pan more than 3 times that of Doelger and Prescott without lowering the yield. (Compare (a) and (e) of the following table):

TABLE III (From page 363, "Industrial Microbiology," by Prescott & Dunn)

Doelger and Prescott Medium (Pan 25 x 33 cm.)

|   | Medium volume surface area ratio, cc. per sq. cm. | Original volume in cc. | Sucrose per pan in g. | Final volume in cc. | Citric acid per 100 cc. in g. | Total citric acid per pan in g. | Yield citric acid in per cent of sugar used |
|---|---|---|---|---|---|---|---|
| a | 2.45 | 2,000 | 280 | 1,810 | 6.35 | 114.9 | 41.0 |
| b | 2.20 | 1,800 | 252 | 1,620 | 7.05 | 114.2 | 45.3 |
| c | 2.08 | 1,700 | 238 | 1,490 | 7.40 | 110.3 | 46.3 |
| c' | 1.83 | 1,500 | 210 | 1,310 | 7.75 | 110.2 | 48.3 |
| d | 1.22 | 1,000 | 140 | 780 | 8.80 | 68.6 | 49.0 |

Duration 9 days.

Our medium as shown in Example 2

(Pan 25 x 35 cm.)

|   | Medium volume surface area ratio, cc. per sq. cm. | Original volume in cc. | Sucrose per pan in g. | Final volume in cc. | Citric acid per 100 cc. in g. | Total citric acid per pan in g. | Yield citric acid in per cent of sugar used |
|---|---|---|---|---|---|---|---|
| e | 5.15 | 4,375 | 875 | 4,000 | 12.43 | 497 | 56.8 |
| f | 4.20 | 3,750 | 750 | 4,200 | 10.45 | 439 | 58.6 |
| g | 3.00 | 2,500 | 500 | 3,000 | 9.40 | 282 | 56.4 |

Duration 7 to 9 days.

Referring to Table III, larger volumes may be used under (e), (f) and (g) than in (a), (b), and (c), because it is possible with our medium to ferment the larger volume of solution with the same exposed area, without any decrease in yield. Doelger and Prescott were not able to use larger volumes with their medium without a drop in the yield.

These improvements result from adding to the medium the proper amounts of nutrient nitrogen and potassium in proportion to the amount of fermentable sugars present, and in the proper ratio to each other. We do not advance any theory to explain the superior results obtained in spite of inferior raw materials, but only reiterate that nitrogen and potassium in the form, amounts and relative ratios in which we add them, constitute essentially the necessary nutritive material for rapid initial growth of the fungi, and rapid production of citric acid in the presence of impurities which would otherwise be detrimental.

Having thus described our invention, what we claim as new and desire to secure by Letters Patent is:

1. The process for producing citric acid, which comprises fermenting a sucrose medium containing from 9 grams to 15 grams of an organic nitrogen-containing compound and 14 grams to 26 grams of a potassium salt of an organic acid per 2500 cc. of mixture containing 20% sucrose, with a citric acid producing fungus.

2. The process for producing citric acid, which comprises fermenting a sucrose medium containing from 9 grams to 15 grams of an organic nitrogen-containing compound and 14 grams to 26 grams of a potassium salt of an organic acid per 2500 cc. of mixture containing 20% sucrose, with *Aspergillus niger*.

3. The process for producing citric acid, which comprises fermenting a sucrose medium containing from 9 grams to 15 grams of an organic nitrogen-containing compound and 14 grams to 26 grams of potassium acetate per 2500 cc. of mixture containing 20% sucrose, with a citric acid producing fungus.

4. The process for producing citric acid, which comprises fermenting a sucrose medium containing from 9 grams to 15 grams of urea and 14 grams to 26 grams of a potassium salt of an organic acid per 2500 cc. of mixture containing 20% sucrose, with a citric acid producing fungus.

5. The process for producing citric acid, which comprises fermenting a sucrose medium containing from 9 grams to 15 grams of urea and 14 grams to 26 grams of potassium acetate per 2500 cc. of mixture containing 20% sucrose, with a citric acid producing fungus.

WILLIAM EISENMAN.
MAX D. BLUMENFELD.